United States Patent [19]

Pile et al.

[11] 4,127,759

[45] Nov. 28, 1978

[54] ELECTRICAL RESISTANCE WELDING APPARATUS

[75] Inventors: David S. Pile; Alan J. Vernau, both of High Wycombe, England

[73] Assignee: James Terence Higgins, Montreal, Canada

[21] Appl. No.: 749,302

[22] Filed: Dec. 10, 1976

[30] Foreign Application Priority Data

Dec. 11, 1975 [GB] United Kingdom ............. 50822/75

[51] Int. Cl.² ............................................. B23K 11/00
[52] U.S. Cl. ....................................... 219/56; 219/80; 219/160; 219/161
[58] Field of Search .................... 219/56, 57, 58, 80, 219/160, 161; 140/112

[56] References Cited

U.S. PATENT DOCUMENTS

| | | | |
|---|---|---|---|
| 3,215,169 | 11/1965 | Silliman et al. | 219/56 X |
| 3,579,259 | 5/1971 | Kato | 219/56 |
| 3,706,331 | 12/1972 | Pennington | 219/56 X |
| 3,718,797 | 2/1973 | Pfender | 219/56 |

FOREIGN PATENT DOCUMENTS

| | | | |
|---|---|---|---|
| 401,443 | 2/1974 | U.S.S.R. | 140/112 |
| 426,782 | 1/1975 | U.S.S.R. | 140/112 |

*Primary Examiner*—E. A. Goldberg
*Attorney, Agent, or Firm*—McCormick, Paulding & Huber

[57] ABSTRACT

An electrical resistance welding apparatus for spot welding workpieces together is comprised of a mounting on which two anvil blocks are supported for displacement relative to one another in order to engage and clamp a workpiece to the mounting in preparation for welding. At least one of the blocks which engages a workpiece is also electrically conductive to serve as one welding electrode in the spot welding process. A secondary electrode positioned in the vicinity of the electrically conductive anvil block clamps a second workpiece against the first on the mounting for spot welding. The mounting is electrically conductive and is electrically connected with the conductive anvil block for transmitting welding current from an electrical power source.

21 Claims, 9 Drawing Figures

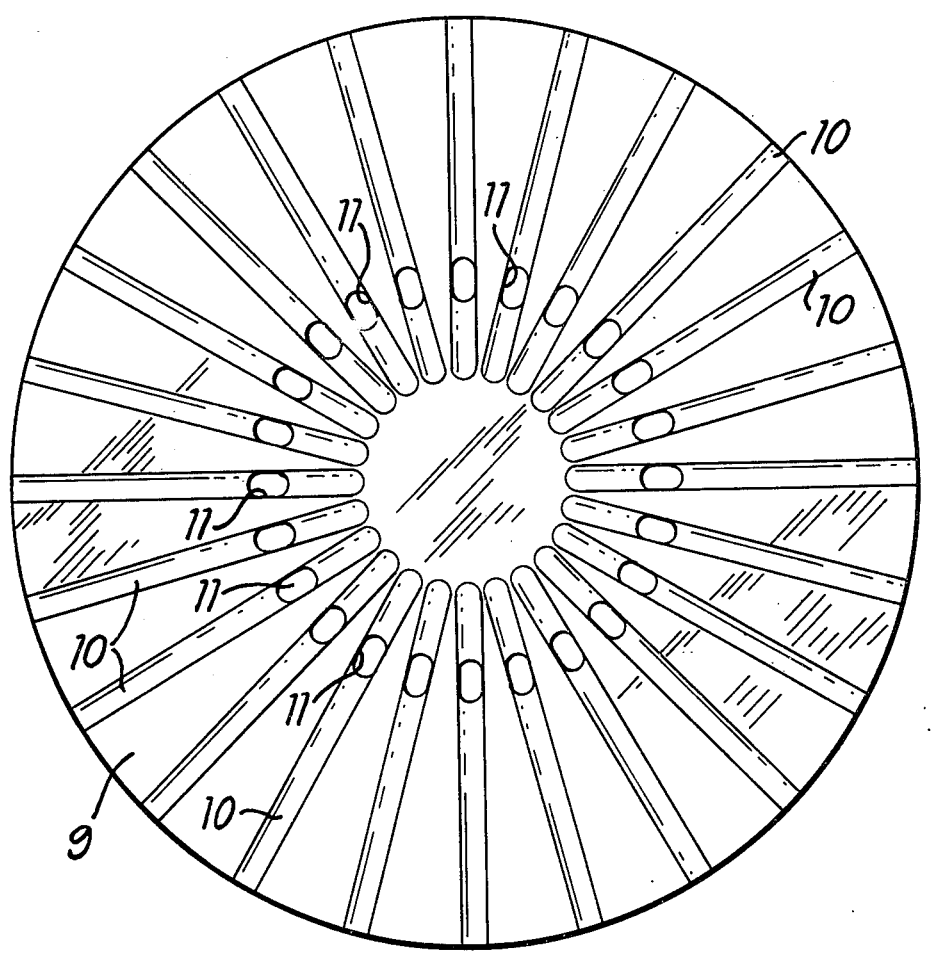

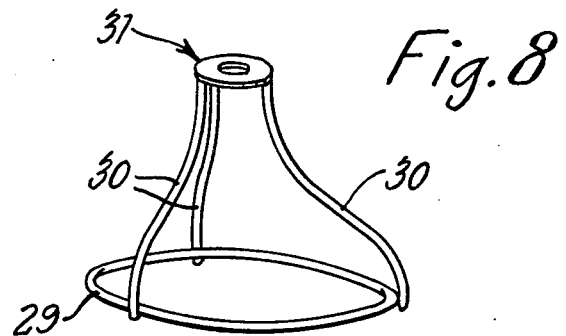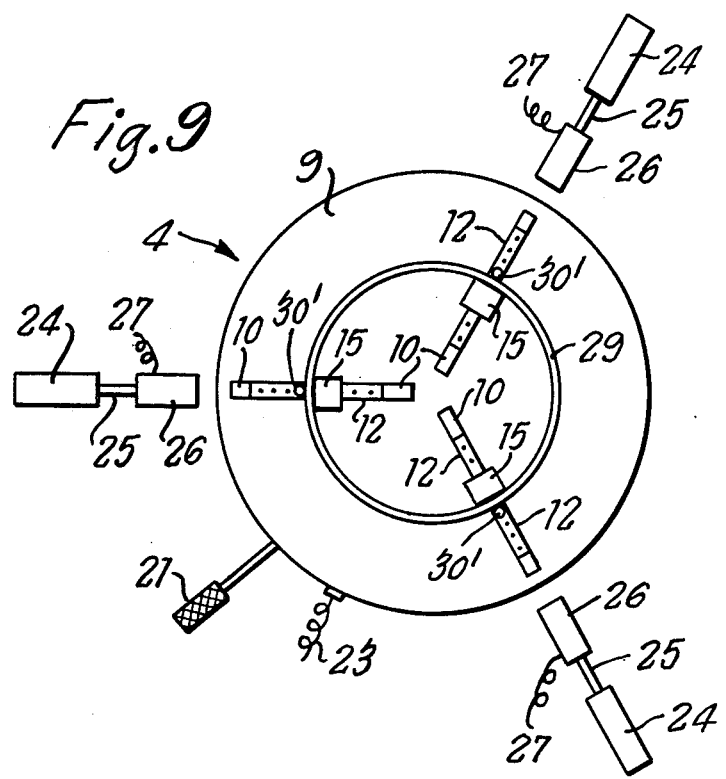

ELECTRICAL RESISTANCE WELDING APPARATUS

This invention relates to electrical resistance welding apparatus and is more especially concerned with such apparatus for, what is known in the art as, spot welding.

According to the present invention there is provided an electrode assembly for electrical resistance welding apparatus and which comprises a mounting; at least two anvil blocks carried on the mounting in spaced relationship, at least one of said blocks being carried for displacement relative to the mounting and at least one of said blocks providing an electrode, and control means for moving the displaceable anvil block or blocks relative to the mounting so that said blocks can engage and clamp a workpiece to be welded; the assembly having an arrangement whereby an electric current can be passed to the or each electrode anvil block through said mounting and the or each electrode anvil block can serve to support the workpiece during spot welding of a second workpiece thereto when a secondary electrode is positioned in contact with the second workpiece in the vicinity of the or an electrode anvil block.

Further according to the present invention there is provided electrical resistance welding apparatus which includes an electrode assembly as specified in the immediately preceding paragraph and at least one displaceable secondary electrode which is capable of being positioned adjacent to a workpiece clamped by the anvil blocks to permit spot welding of a second workpiece to the first workpiece where such workpieces contact each other in the vicinity of the or an electrode anvil block.

The present invention was primarily developed to facilitate the spot welding of crossed wires or strips as, for example, in the manufacture of lamp-shade frames and the like; for convenience therefore, the Specification will hereinafter consider such use of the invention although it is to be realised that other uses of the apparatus will be apparent to persons skilled in the art and having an understanding of the invention.

Conventional forms of lamp-shade frames generally comprise at least one wire ring to which is welded the ends of a peripherally spaced array of wire struts to provide a cage for carrying the fabric of the lampshade. The ends of the wire struts may be welded to the wire ring at one of several orientations on the ring, for example, on the radially inner face of the ring, on the radially outer face of the ring or on a side face of the ring parallel to the plane of the ring; by the electrode assembly of the present invention the welding of the crossed wires can be achieved when they are in any one of these several orientations.

At least three anvil blocks may be circumferentially disposed in a spaced array on the mounting (which will usually be in the form of, and is conveniently regarded as, a flat plate) and arranged so that by actuation of the control means one or more of such blocks are displaceable radially of the mounting into clamping engagement with the workpiece. In the case of a wire ring workpiece, the anvil blocks may be arranged to clamp the wire ring externally thereof so that they engage with its radially outer face and thereby permit a wire strut to be spot welded to the wire ring on its radially inner face or a side face as aforementioned. Alternatively, the anvil blocks may be arranged to clamp the wire ring internally so that they engage with its radially inner face and thereby permit a wire strut to be spot welded either to the radially outer face or the side face of the ring.

Depending upon the particular form of clamping of the workpiece (such as internal or external as mentioned above) and the desired orientation of the second workpiece, will be the manner in which the secondary electrode is mounted to move into a position to effect the spot welding between, say a wire strut and a clamped wire ring. Preferably the secondary electrode is arranged to exert a pressure on the two crossed wires directly against an electrode anvil block to ensure that efficient spot welding is achieved. The or each electrode anvil block in this way serves to effect partial clamping of the workpiece during spot welding and also to provide a firm base against which the welding is effected.

In one form of construction the welding apparatus may have a single secondary electrode while the electrode assembly (that is at least the mounting plate and the anvil blocks which it carries) is rotatable so that the electrode assembly can be rotationally indexed to move the electrode anvil blocks sequentially into a position at which spot welding with the secondary electrode can be effected. Alternatively, the electrode assembly may be stationary and the electrode anvil blocks (or selected ones of such blocks) may each have associated therewith a discrete secondary electrode so that all such secondary electrodes can be operated separately or simultaneously to effect spot welding with their associated electrode anvil blocks.

The control means for effecting displacement of the, or some of the, anvil blocks relative to the mounting is preferably in the form of a cam arrangement. Conveniently a cam plate is carried to be rotatable relative to the mounting and has cam surfaces, such as slots, which engage with cam followers, such as pins, on the respective anvil blocks so that, upon relative rotation between the cam plate and the mounting, the anvil blocks are displaced, as a result of the co-acting cam followers and cam surfaces, relative to the mounting plate and to a pre-determined extent.

Embodiments of the present invention will now be described, by way of example only, with reference to the accompanying illustrative drawings, in which:

FIG. 3 is a plan view of a mounting plate incorporated in the electrode assembly, of the apparatus in FIG. 2;

FIG. 8 is a perspective view of a lamp-shade pendant, and

FIG. 9 is a plan view of a further form of apparatus constructed in accordance with the present invention and suitable for manufacture of the pendant shown in FIG. 8.

Where possible throughout the following description the same parts or members in each of the FIGURES have been accorded the same references.

Figure 1:
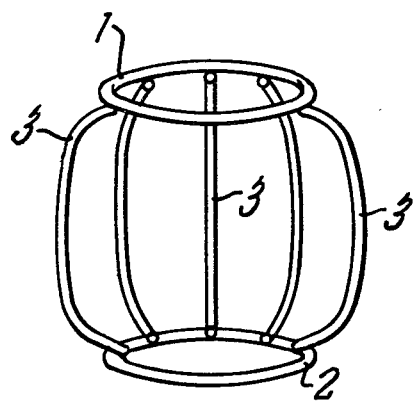
FIG. 1 is a perspective view of part of a lamp-shade frame typical of that which may be manufactured by the apparatus shown in FIG. 2.
Figure 4:
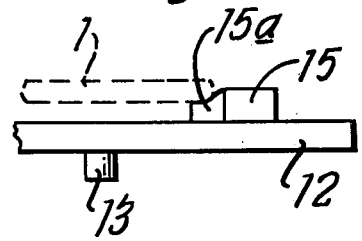
FIG. 4 is a side elevation of an electrode anvil block and slide bar on which it is carried for mounting in the plate of FIG. 3.

The lamp-shade frame shown in FIG. 1 comprises a pair of opposed and parallel wire rings 1 and 2 which are interconnected by an array of wire struts 3. The struts 3 are substantially bow-shaped and their respective ends lie against the opposed side faces (being those faces which are substantially parallel to the planes of the rings) of the rings 1 and 2 to which they are spot welded. The struts 3 will, in a typical lamp-shade frame, be symmetrically disposed around the rings 1 and 2 and vary in number up to say twenty-four to provide a firm cage for receiving the material of the lamp-shade. Apparatus for manufacturing a lamp-shade similar to that shown in FIG. 1 is, illustrated in FIGS. 2 to 7 and comprises an electrode assembly shown generally at 4 which is axially rotatable with a shaft 5. The shaft 5 is carried by bearings in a frame 6 of a support 7 and is coupled to indexing means 8 (such as a pawl and ratchet mechanism) by which the shaft and electrode assembly can be controlled for indexed rotation.

The electrode assembly 4 comprises a circular mounting plate 9 of copper (see FIG. 3) which is secured for rotation with the shaft 5. In one side face of the plate 9 are 24 radially extending channels 10 which are symmetrically disposed circumferentially around the plate.

Located in each channel 10 is an aperture 11 which is elongated longitudinally of its respective channel and opens into the opposite side face of the plate. Mounted as a close sliding fit, one in each of the channels 10 are 24 copper slide bars 12 (see FIG. 4) each of which has a stainless steel fixed pin 13 extending downwardly therefrom. The pins 13 extend through the holes 11 in their respective channels and are arranged so that the slide bars 12 can exhibit restricted radial displacement on the plate 9 to an extent determined by the longitudinal movement permitted by the pins 13 in the apertures 11. Circumferential displacement of the bars 12 is restrained by their close fit in the channels 10. Screwed on to the upper side of each of the slide bars 12 is an electrode anvil block 15 of copper. The slide bars 12 conveniently carry a longitudinal array of tapped holes in their upper sides so that the screwed position of the anvil blocks 15 on their respective slide bars can be varied. Consequently, the mounting plate 9 can carry 24 circumferentially disposed electrode anvil blocks 15 (although only two such blocks have been shown in FIG. 2 for convenience) each of which is capable of limited radial displacement on the plate 9.

Figure 5:
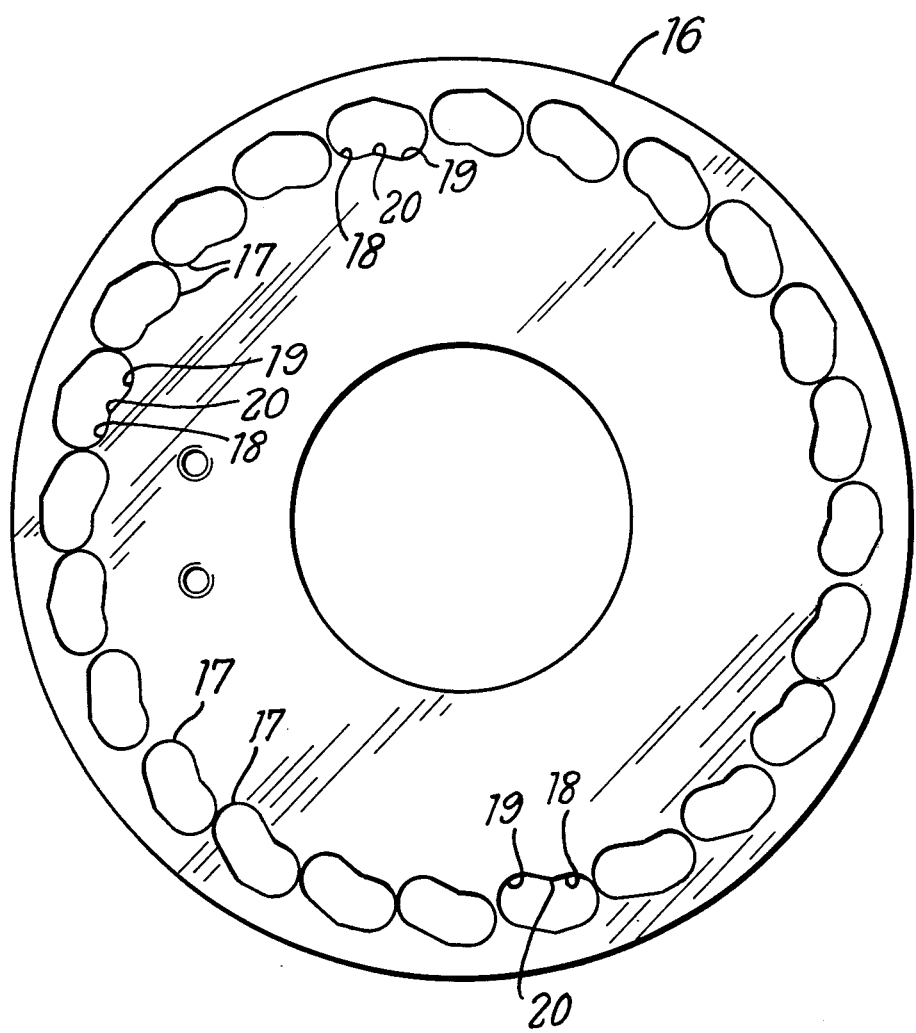
FIG. 5 is a plan view of a cam plate incorporated in the electrode assembly of the apparatus in FIG. 2.
Figure 6:
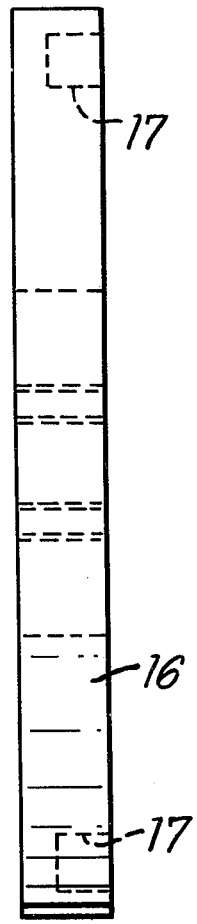
FIG. 6 is a side elevation of the plate in FIG. 5.
Figure 7:
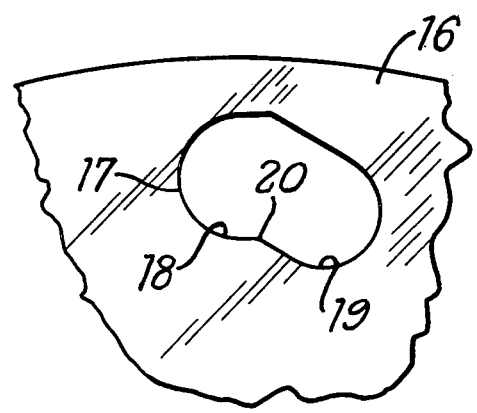
FIG. 7 is an enlarged view of a cam slot in the plate of FIG. 5.

Rotatably mounted on the shaft 5 and in face-to-face contact with the mounting plate 9 is a stainless steel annular cam plate 16 (see FIGS. 5 to 7). Machined in the side face of the cam plate 16 which abuts the plate 9 is a circumferentially spaced array of 24 cam slots 17. The cam slots 17 are circumferentially disposed to receive, one each, the free ends of the pins 13 which emerge from the apertures 11 of the mounting plate 9. As will be seen from FIGS. 5 and 7 each slot 17 is substantially kidney-shaped to provide a radially outer part 18 and a radially inner part 19 with a crest 10 between such parts. With the cam plate 16 rotatable on the shaft 5 and the pins 13 engaging with the respective cam slots 17 it will be apparent that relative rotation between the cam plate and mounting plate 9 is possible within the limits imposed by movement of a pin 13 in its respective cam slot 17; during such relative rotation the pins 13 slide in their respective slots between the radially outer and inner parts 18 and 19 thereby imparting radial displacement to the slide bars 12 and electrode anvil blocks 15 on the plate 9. Radial displacement is effected simultaneously for all 24 electrode blocks between radially inner and outer limits determined by the cam profile parts 18 and 19. In sliding from one slot part 18 or 19 to the other, the pins 13 pass over the crests 20 which are preferably designed to provide an intermediate resistance which requires slightly increased torque to rotate the plate 16 relative to the plate 9 (as compared with the torque necessary to effect initial sliding of the pins along either of the slot parts) - this is intended to alleviate the likelihood of the pins 13 from slipping inadvertently from one slot part 18 or 19 to the other.

A lever 21 is provided on the cam plate 16 for manually rotating such plate relative to the plate 9 and by reciprocation of the lever 21 about the axis of the shaft 5, the anvil blocks 15 are displaced alternately radially outwardly and inwardly, the latter permitting the ring member 1 to be clamped externally by the array of anvil blocks 15 as the pins 13 slide from the cam slot part 18 to the part 19. By the facility to adjust the position of each anvil block 15 on its slide bar 12 the array of anvil blocks can be varied to accommodate and clamp wire rings 1 of various diameters.

Figure 2:
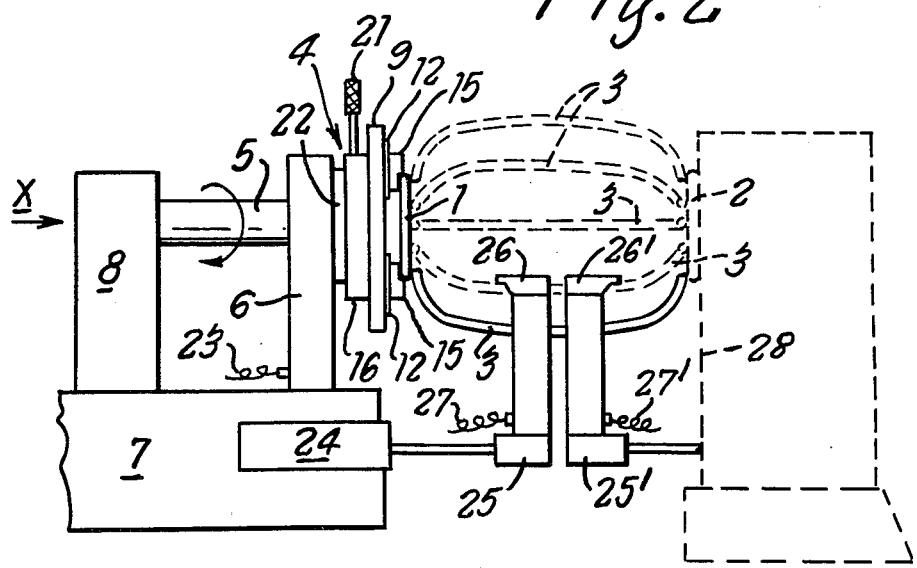
FIG. 2 is a side elevation of one form of electrical resistance welding apparatus constructed in accordance with the present invention.

Located in face-to-face contact with the cam plate 16 on the side thereof remote from the plate 9 is an annular plate 22 of copper which is rotatable on the shaft 5 in face-to-face contact with the frame 6. As shown in FIG. 2, the frame 6 is connected at 23 to an appropriate electrical power source while the electrode assembly 4 is of low resistance to which current passes from the frame 6 and by way of the plate 22 which serves as a slip ring.

Mounted on the support 7 is a fluid pressure operated reciprocating piston and cylinder device 24 which controls displacement of a ram 25. Carried by the ram 25 is a secondary electrode 26 having a terminal 27 for connection to the electrical power source. Operation of the device 24 moves the secondary electrode 26 in a direction substantially parallel with the axis of shaft 5 and to a position at which it closely overlies an electrode anvil block 15.

To spot weld a strut 3 (shown by the continuous line in FIG. 2) to the wire ring 1, an end of the strut is fed into the apparatus to overlie an anvil block 15 (while the latter is positioned in the line of movement of the electrode 26 as determined by the ram 25) and is retained in that position. The device 24 is now operated to displace the secondary electrode 26 until it abuts the end of the strut 3 and exerts pre-determined pressure on the crossed wires against the anvil block 15 following which current is passed between the terminals 23 and 27 to effect a spot weld.

To expedite manufacture of the wire frames, the electrode assembly 4, indexed shaft 5 and mounting therefor, together with the secondary electrode 26 and means for displacing said electrode as shown on the left-hand side of the apparatus in FIG. 2 are duplicated on the right-hand side of the apparatus in FIG. 2 (as shown at 25', 26', 27' and, for convenience, by the chain box 28). This duplicated part of the apparatus clamps the wire ring 2 in a similar manner to that described for the clamping of the wire ring 1 and serves to spot weld the appropriate end of the strut 3 to the wire ring 2 by action of the secondary electrode 26' (under control of its ram 25') simultaneously with and in a similar manner to the spot welding effected between the secondary electrode 26 and the anvil block 15.

After the ends of a strut 3 have been welded to the rings 1 and 2, these rings are rotated by indexing of the shaft 5 (in a clockwise direction as viewed by the arrox X in FIG. 2) to move the next opposed pair of electrode anvil blocks 15 into alignment with the direction of movement of the secondary electrodes 26 and 26′ following which a further strut 3 is fed to the apparatus for spot welding in a manner similar to that previously discussed. Conveniently stops (not shown) are provided on the apparatus to ensure that the ends of the struts 3 are correctly located prior to them being spot welded to the rings. By this procedure twenty-four struts may be welded successively to the rings 1 and 2 as illustrated by the chain lines 3 in FIG. 2. Upon completion of the framework the levers 21 are moved to open the anvil blocks of the respective electrode assemblies and release the rings; conveniently the two support parts 7 are movable away from each other at this stage to facilitate removal of the framework from between the opposed mounting plates.

Although the apparatus above described with reference to FIGS. 1 to 7 is capable of welding twenty-four struts to the rings 1 and 2, if required this number may be reduced by appropriate indexing of the shaft 5 so that some of the anvil blocks 15 are not utilised as electrodes (although they are preferably retained on the mounting plate to provide firm clamping of the wire rings). The electrode blocks 15 will generally be provided with removable portions 15a (see FIG. 4) as will be the electrodes 26 to facilitate servicing when such portions wear from constant use in spot welding.

Although the wire ring 1 as shown in FIG. 2 is clamped externally it will be apparent that the anvil blocks 15 can effectively clamp such ring internally when they are encircled by the ring and during movement of the blocks radially outwardly as the pins 13 are displaced from the cam slot parts 19 to the cam slot parts 18. Furthermore, depending upon the manner and orientation in which the struts 3 are required to be welded to the wire rings then the mounting of the fluid operated device 24 on the support 7 can be re-arranged accordingly to ensure that the secondary electrode 26 is moved by its ram as appropriate to effect a spot weld. For example, if the end of a strut 3 as shown in FIG. 2 is required to be spot welded to the radially inner face of the ring 1 then the ram device may be rotated through 90° and re-positioned as appropriate to ensure that the secondary electrode 26 moves radially of the shaft 5 to effect a spot weld of the crossed wires over an electrode anvil block 15.

In the form of the apparatus shown in FIG. 9, the electrode assembly 4 is stationary (in so far as it is not rotatable) and basically comprises the mounting plate 9 which carries the electrode anvil blocks 15 in a similar manner to that shown in FIG. 2 and the cam plate 16. The plate 16 underlies and is co-axial with the plate 9 in FIG. 9 and is capable of partial axial rotation by movement of the lever 21 to effect radial displacement of the blocks 15 in a similar manner to that previously described with reference to FIGS. 2 to 7. For convenience, in FIG. 9 three anvil blocks 15 have been illustrated although it will be appreciated that this number can be varied as required.

The apparatus shown in FIG. 9 is particularly suitable for use in the manufacture of a lamp-shade pendant as shown in FIG. 8 and comprising a wire ring 29 to the radially outer side of which the free ends of three wire legs 30 of a preformed spider 31 are spot welded.

To manufacture the pendant shown in FIG. 8 on the apparatus of FIG. 9, the ring 29 is located to encircle the electrode anvil blocks 15 which are then displaced radially outwardly of the plate 9 by movement of the lever 21 to clamp the ring 29 internally. The spider 31 is now positioned over the plate 9 so that the free ends of its legs 30 are located adjacent to the radially outer face of the ring 29 and in radial alignment one with each of the blocks 15 (as shown at 30′ in FIG. 9). Each block 15 has associated therewith a secondary electrode 26 which is displaceable on its ram 25 by the fluid operated device 24 radially towards and from its associated block 15. With the spider 31 appropriately positioned over the ring 29 the secondary electrodes 26 are moved radially inwardly simultaneously to abut the crossed wires 29 and 30 and exert pressure thereon between the pairs of opposed electrodes and effect spot welding by passage of current between the terminals 23 and 27. It will be noted that the terminal 23 is, in this example, conveniently connected directly with the stationary mounting block 9. After welding the secondary electrodes 26 are withdrawn radially outwardly and under control of their rams while the electrode anvil blocks 15 are withdrawn radially inwardly by movement of the lever 21 to release the complete pendant frame. In a similar manner to that previously discussed with reference to the apparatus shown in FIGS. 2 to 7, the anvil blocks 15 may be used to clamp the ring 29 externally and the position and direction of displacement of the secondary electrodes 26 may be varied depending upon the desired orientation between the crossed wires relative to the associated anvil blocks 15.

What we claim is:

1. An electrode assembly for electrical resistance welding apparatus which comprises: a mounting; at least two anvil blocks carried on the mounting in spaced relationship, at least one of said blocks being supported for displacement relative to the mounting and the other anvil blocks, and at least one of said blocks being electrically conductive to serve as an electrode whereby an electric welding current can be passed through said conductive anvil block; control means for moving at least one of the displaceable anvil blocks relative to the mounting and the other anvil blocks so that the blocks can together engage and clamp a workpiece to the mounting in preparation for welding; and a secondary welding electrode positioned in the vicinity of the electrically conductive anvil block for clamping a second workpiece against the first workpiece whereby the two workpieces may be spot welded together by means of electric currents passing between the electrically conductive anvil block and the secondary electrode.

2. An electrode assembly for electrical resistance welding apparatus as defined in claim 1 wherein the mounting is an electrically conductive mounting, and the electrically conductive anvil blocks are connected electrically with the mounting whereby welding current may pass between the mounting and the anvil blocks during welding.

3. An electrode assembly as claimed in claim 1 and having at least three anvil blocks, said anvil blocks being circumferentially disposed in a spaced array on the mounting and being arranged so that by actuation of the control means at least one of said blocks is displaceable radially of the circumferential array and relative to the mounting to effect clamping of a workpiece.

4. An electrode assembly as claimed in claim 1 wherein the displaceable anvil blocks are mounted in channels in the mounting along which channels they are respectively slidable to an extent determined by said control means.

5. An electrode assembly as claimed in claim 1 wherein the control means comprises a cam arrangement which is adjustable relative to the mounting to effect controlled displacement of the displaceable anvil blocks.

6. An electrode assembly as claimed in claim 5 wherein the control means comprises a cam plate which is rotatable relative to the mounting, said cam plate having cam surface means which engages with cam follower means on the displaceable anvil blocks so that upon relative rotation between the cam plate and the mounting the displaceable anvil blocks are displaced relative to the mounting and to a predetermined extent as a result of relative movement between the co-acting cam follower means and cam surface means.

7. An electrode assembly as claimed in claim 6 wherein the cam surface means partly defines at least one slot in the cam plate and the cam follower means associated therewith comprises a pin on the respective displaceable anvil blocks which pin is received within the slot to follow the cam surface means.

8. An electrode assembly as claimed in claim 7 in which the cam slots are disposed circumferentially about the rotatable cam plate and at least one of the slots in the cam plate is substantially kidney-shaped to provide a radially outer part and a radially inner part between which parts the pin received by said slot is displaced during relative rotation between the cam plate and the mounting to impart radial displacement to the anvil block associated with that pin, and whereon a crest is provided between said inner and outer slot parts over which crest the pin has to be displaced in moving between said inner and outer slot parts to provide an intermediate resistance to said displacement of the pin.

9. An electrode assembly as claimed in claim 1 wherein the mounting comprises a plate having a substantially flat side face on which the anvil blocks are mounted.

10. An electrode assembly as claimed in claim 6 in which the mounting comprises a mounting plate having a substantially flat side face on which the anvil blocks are mounted and; wherein the cam plate is mounted on the side face of the mounting plate remote from the anvil blocks.

11. An electrode assembly as claimed in claim 10 in which the cam surface means partly defines at least one slot in the cam plate and the cam follower means associated therewith comprises a pin on the respective displaceable anvil blocks which pin is received within the slot to follow the cam surface means and; wherein the pin on the displaceable anvil blocks extends through an aperture in the mounting plate to engage with the respective slot in the cam plate.

12. An electrode assembly as claimed in claim 1 wherein at least one displaceable anvil block comprises an assembly of a first part which is moveable over the mounting under control of said control means and a block part, said block part being intended to engage and support a workpiece and being capable of adjustment in position on the first part for engaging and supporting workpieces of different sizes.

13. Electrical resistance welding apparatus which includes an electrode assembly as claimed in claim 1 including at least one displaceable secondary electrode which is capable of being positioned adjacent to a workpiece clamped by the anvil blocks to permit spot welding of a second workpiece to the first workpiece where such workpieces contact each other in the vicinity of the electrically conductive anvil block.

14. Electrical resistance welding apparatus as claimed in claim 13 wherein the displaceable secondary electrode is displaceable to a spot welding position in which it is intended to exert a pressure on the overlying first and second workpieces directly against the electrically conductive anvil block whereby said anvil block provides a base against which welding is effected.

15. Electrical resistance welding apparatus claimed in claim 13 wherein the electrode assembly has at least two circumferentially spaced electrically conductive anvil blocks and the mounting plate is rotatable relative to a secondary electrode to move said two anvil blocks sequentially into a position at which spot welding with the secondary electrode can be effected.

16. Electrical resistance welding apparatus as claimed in claim 13 wherein the electrode assembly has at least two electrically conductive anvil blocks and each of such anvil blocks has associated therewith a discrete secondary electrode so that all such secondary electrodes can be operated separately or simultaneously to effect spot welding with their respectively associated anvil blocks.

17. Electrical resistance welding apparatus as claimed in claim 13 in which the anvil blocks are disposed on the mounting to be capable of engaging and clamping a substantially flat ring of wire to which an end of at least one wire strut is capable of being spot welded by operation of the displaceable secondary electrode.

18. Electrical resistance welding apparatus as claimed in claim 15 in which the anvil blocks are disposed on the mounting to be capable of engaging and clamping a substantially flat ring of wire to which an end of at least one wire strut is capable of being spot welded by operation of the secondary electrode and wherein two electrode assemblies are provided having rotatable mountings which are in spaced and opposed relationship to each other so that the anvil blocks on the respective mountings are capable of engaging and clamping, one each, two substantially flat rings of wire so that said wire rings are in substantially parallel planes and in opposed spaced relationship to each other, said mountings being rotatable relative to two secondary electrodes associated one with each of the two electrode assemblies so that electrode anvil blocks on the respective electrode assemblies can be moved sequentially by rotation of their respective mountings to positions at which successive wire struts mounted to extend between the wire rings can be spot welded, by operation of the secondary electrodes, to both wire rings.

19. Electrical resistance welding apparatus as claimed in claim 18 wherein the spacing between the two electrode assemblies is adjustable.

20. Electrical resistance welding apparatus as claimed in claim 17 wherein the secondary electrode is displaceable towards an electrode anvil block to effect spot welding therewith in a direction which is substantially at right angles to the plane of a substantially flat ring of wire which is intended to be clamped by the electrode assembly of which that electrode anvil block forms part.

21. Electrical resistance welding apparatus as claimed in claim 17 wherein the secondary electrode is displaceable towards an electrically conductive anvil block to effect spot welding therewith in a direction which is substantially parallel to the plane of a substantially flat ring of wire which is intended to be clamped by the electrode assembly of which that electrically conductive anvil block forms part.

* * * * *